Figure 1:
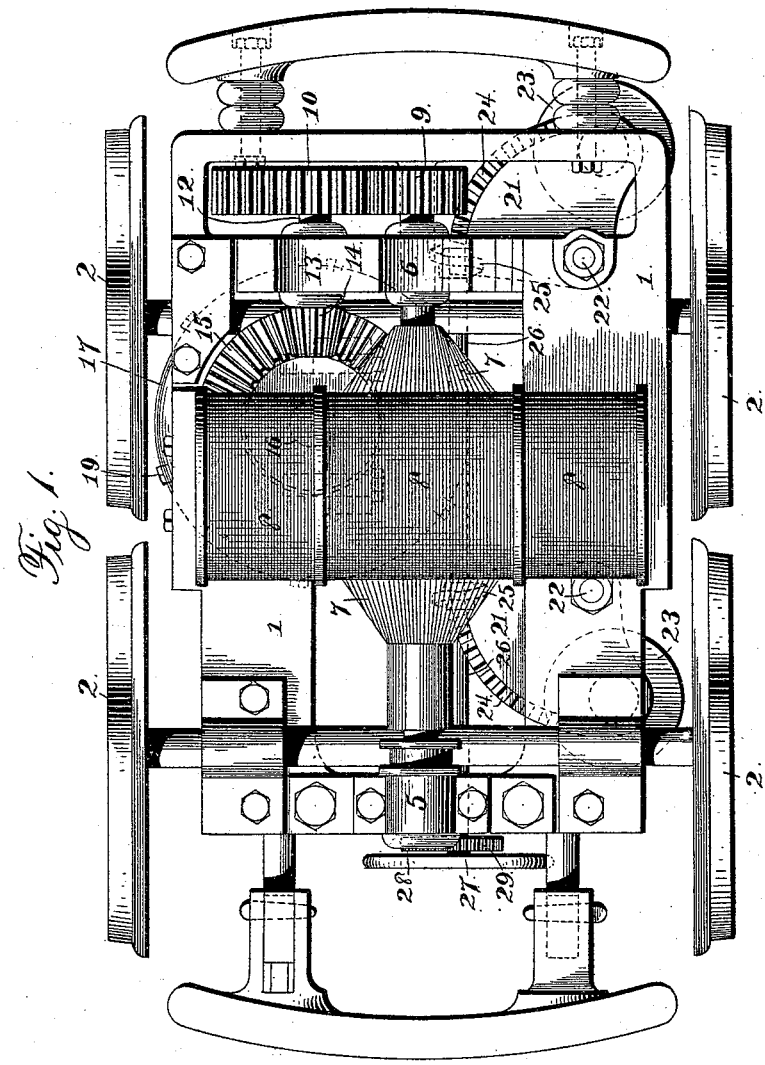

(No Model.) 3 Sheets—Sheet 1.

F. A. POCOCK.
ELECTRIC MOTOR CAR.

No. 450,189. Patented Apr. 14, 1891.

(No Model.) 3 Sheets—Sheet 3.
F. A. POCOCK.
ELECTRIC MOTOR CAR.

No. 450,189. Patented Apr. 14, 1891.

Witnesses:
Jas. E. Hutchinson.
A. H. Norris.

Inventor:
Francis A. Pocock,
By James L. Norris,
Attorney.

UNITED STATES PATENT OFFICE.

FRANCIS A. POCOCK, OF SCRANTON, PENNSYLVANIA, ASSIGNOR OF TWO-THIRDS TO ELMER H. LAWALL AND RUFUS J. FOSTER, BOTH OF SAME PLACE.

ELECTRIC-MOTOR CAR.

SPECIFICATION forming part of Letters Patent No. 450,189, dated April 14, 1891.

Application filed July 3, 1890. Serial No. 357,592. (No model.)

*To all whom it may concern:*

Be it known that I, FRANCIS A. POCOCK, a subject of the Queen of Great Britain, residing at Scranton, in the county of Lackawanna and State of Pennsylvania, have invented new and useful Improvements in Electric-Motor Cars, of which the following is a specification.

This invention relates to that type of railway systems wherein a wheeled car travels on rails and is provided with wheels rotated by a motor and acting on a stationary or non-traveling cable to propel the car by traction on the cable. In those systems wherein the load to be hauled and the motor-car are supported by and travel upon railway-rails the motor-driven traction or grip wheels usually revolve in a vertical plane, and consequently when the non-traveling cable is once engaged with such wheels it is impossible to drop the cable at will while the car is traveling. This is a serious objection in the former systems and renders it impracticable to run the cars on branch roads, as in mine-haulage. The arrangement of the motor-driven traction or grip wheels to revolve in a vertical plane is also objectionable for mine-haulage, in that the height of the motor-car as a whole is necessarily such as to interfere with its employment in the general traffic of a mine.

The present invention has for its object to provide a new and improved electric-motor car of such construction that it is propelled at the speed of the grip-wheel and can be instantly released by the engineer from engagement with the non-traveling cable for running the car on a branch track or road, as occasion demands.

The invention also has for its object to reduce the height of an electric-motor car traveling on railway-rails for the purpose of practically adapting the car to haulage in mines.

The invention also has for its object to provide an electric-motor car with a novel revolving grip and means whereby the speed of the grip is reduced.

The invention also has for its object to provide novel lever mechanism for instantly causing the non-traveling cable to move at the will of the engineer into and out of engagement with a horizontally-revolving grip-wheel.

To accomplish all these objects my invention involves the features of construction, the combination or arrangement of devices, and the principles of operation hereinafter described, and specifically set forth in the claims, reference being made to the accompanying drawings, in which—

Figure 2:
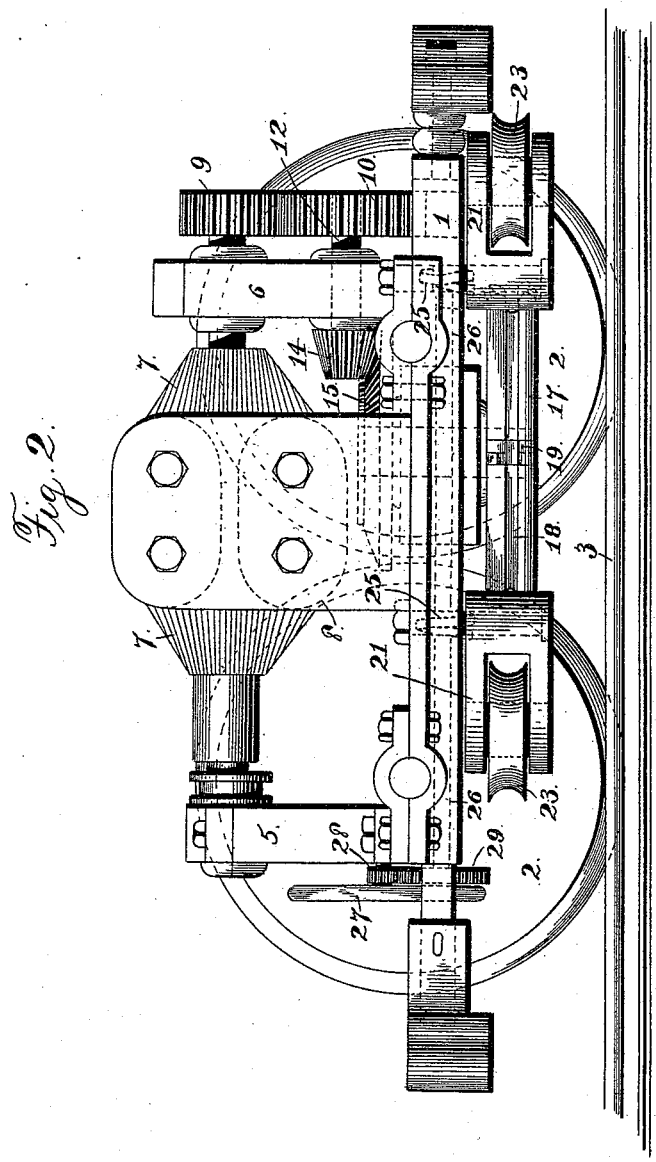
Figure 3:
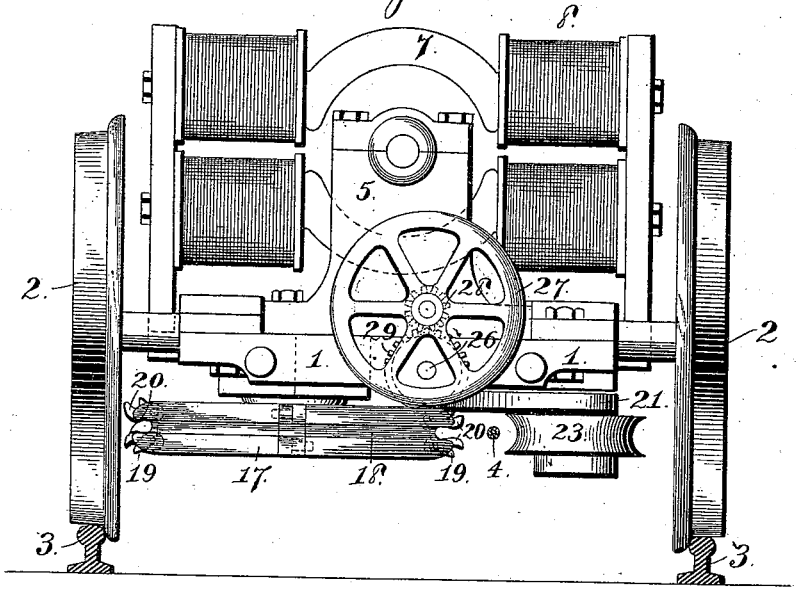
Figure 4:
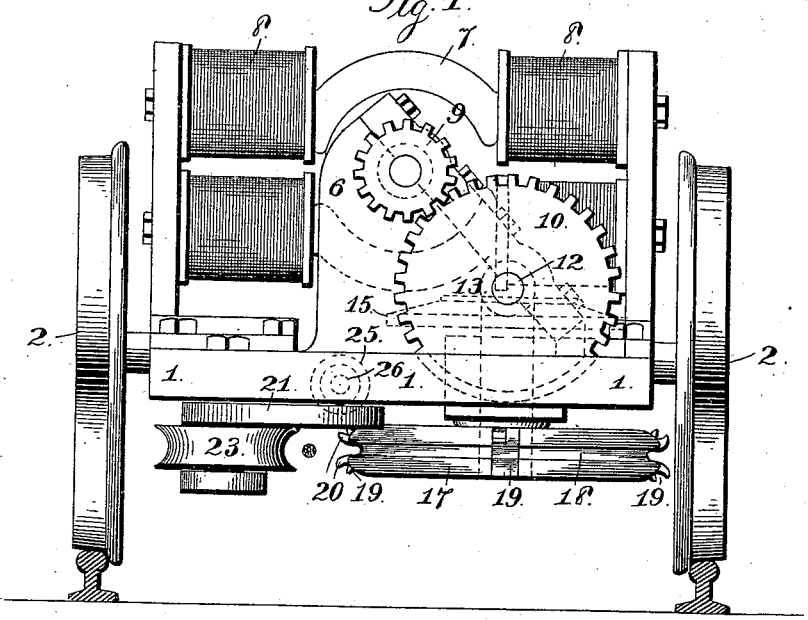

Figure 1 is a top plan view of my improved electric-motor car especially designed for haulage in mines. Fig. 2 is a side elevation of the same omitting one pair of the car-supporting wheels to avoid confusion and more clearly exhibit the grip-wheel and its driving mechanism. Fig. 3 is an elevation looking at one end of the car. Fig. 4 is a similar view looking at the opposite end thereof.

In order to enable those skilled in the art to make and use my invention, I will now describe the same in detail, referring to the drawings, wherein—

The numeral 1 indicates a car-frame, 2 the car-supporting wheels, and 3 the railway-rails on which the car and also the load to be hauled rest and travel. The flexible wire cable 4 extends longitudinally at a point midway between the rails by which the car is supported, and this cable is of that type which can be raised and lowered, but does not travel longitudinally.

In practice I employ a cable connected at one end or other point with a spring or weight to take up slack; but as this is well known I do not deem it essential to illustrate the same in the drawings.

The car-frame is provided at or near the ends with vertical standards 5 and 6, in which is journaled the armature 7 of a rotary electric motor 8, which may be of any known construction adapted to revolve the armature in either direction.

The armature-shaft carries at one end a pinion 9, meshing into a gear-wheel 10, secured to a horizontal shaft 12, journaled, as at 13, in the standard 6 and carrying a bevel-gear 14, which meshes into a crown or face wheel 15, attached to a vertical shaft 16, journaled in suitable bearings on the car-frame.

The crown-wheel is shown above the car-frame; but the crown-wheel shaft 16 hangs below the car-frame, and is therefore pendent.

To the lower end of the pendent shaft is rigidly attached a horizontal grip-wheel 17, having a circumferential groove 18, adapted to receive the cable. The groove contains an annular series of gripping-jaws 19, pivoted together in pairs and having tail-pieces 20 in such manner that as the cable enters between the jaws and presses upon the tail-pieces the jaws positively grip the cable, and as the grip-wheel revolves the car is drawn along the cable at the speed the wheel is revolving. This driving mechanism described constitutes reducing-gearing between the armature-shaft of the electric motor and the horizontally-revolving grip-wheel, whereby the latter moves at a speed considerably less than the armature-shaft. This is useful for that system wherein the electric-motor car and the load to be hauled are supported by and travel on parallel railway-rails between which the non-traveling cable is located.

A horizontally-swinging, segmental, or similarly-shaped plate 21 is pivoted by a vertical pivot-pin 22 near each end of the car-frame on that side which is opposite the side on which the grip-wheel is journaled, and each plate carries a loosely-journaled guide roller or wheel 23, having a circumferential groove to receive and horizontally support the cable. These plates 21 are each provided with a segmental rack 24, engaging a worm 25 on a horizontal shaft 26, extending longitudinally of and journaled in suitable bearings on the car-frame. The worms run right and left or in reverse directions, and consequently the two plates carrying the guide rollers or wheels are simultaneously turned on or with their pivot-pins by rotating the worm-shaft in such manner that by turning the shaft in one direction the guide-rollers engaging and acting on the cable press the latter into the circumferential groove of the grip-wheel for the action of the gripping-jaws therein to propel the car, while a reverse rotation of the worm-shaft will release the cable from the lateral pressure of the guide-rollers, and therefore it is possible to drop the cable entirely out of engagement with the horizontally-revolving grip-wheel while the car is traveling on the railway-rails. This mode of operation is essential and important where it is desired to run the car upon a branch track or road and pick up the cable of such branch.

For the purposes of my invention and to enable the cable to be engaged with and disengaged from the revolving grip-wheel it is necessary to place the cable-guiding roller or wheel devices under complete control of the engineer or attendant, in order that the engagement and disengagement of the grip-wheel and cable can be instantly effected while the car is traveling to run such car on a branch road. I therefore provide means whereby the worm-shaft can be caused to rotate in either direction by the simple movement of a lever within convenient reach of the engineer. In the example here illustrated the lever consists of a hand-wheel 27, connected to a gear-wheel 28, which meshes into a pinion 29, rigidly secured to the worm-shaft 26, whereby the rotary movement of the hand-wheel rapidly rotates the worm-shaft and by the worms thereupon effects the required movement of the guide-rollers 21.

The devices described constitute lever mechanism under control of the attendant for causing the non-traveling cable to engage and disengage the horizontally-revolving grip-wheel. I do not wish to be understood as confining myself to the particular lever mechanism shown, as it may be variously modified without changing the principle of my invention.

The loose rollers or wheels 23 constitute a cable guide and manipulator which not only permits the cable to be dropped from the horizontal grip-wheel for running the car on a branch road, but enables the cable to be sustained horizontally for prompt engagement with the grip-wheel, as occasion demands. To thus sustain the cable, it is only essential to adjust the cable-guide the proper distance away from the grip-wheel and yet place the guide and grip-wheel in such proximity as to retain the cable between them without that lateral pressure which would cause the gripping-jaws of the grip-wheel to seize the cable. By my improved arrangement of parts the car as a whole is reduced in height and brought to a compact structure, which particularly adapts it for hauling in mines where the motor-car and the load to be hauled are supported by and travel on railway-rails.

The invention is capable of more general application than ordinary motor-cars of a similar nature, in that it is possible with my new arrangement to instantly drop the non-traveling cable while the car is traveling for the purpose of running on a branch road.

In my invention the car does not depend upon its weight for the traction power, and therefore it can be constructed much lighter than a car not possessing this advantage, and, being comparatively light, it is well adapted for hauling uphill. This is important in mine-haulage, as the cost of constructing underground roads of even grade is great, though not so great as the cost of making low roads sufficiently high to permit the passage of draft-animals.

By my invention I am enabled to avoid the expense of grading, and also of increasing the height of the road.

Having thus described my invention, what I claim is—

1. The combination of a car-supporting track on which the load to be hauled may also rest and move, a non-traveling cable, a wheeled car traveling on the track, an electric motor mounted on the car, a pendent grip-wheel shaft journaled on the car-frame and carrying a horizontally-revolving grip-wheel having gripping-jaws to seize the cable and from which grip-wheel the cable can be dropped while the car is traveling, a movable cable support and guide under control of the engineer for causing the cable to move into and out of engagement with the grip-wheel, and reducing-gear between the electric motor and the pendent grip-wheel shaft, substantially as described.

2. The combination, with a car adapted to travel on a track and a non-traveling cable, of a motor on the car, a motor-driven horizontally-revolving grip-wheel to engage the cable and from which the cable is capable of being dropped at the will of the engineer to run the car on a branch road, an adjustable cable-guide operating to sustain the cable in engagement with the grip-wheel, and devices operated by the engineer for adjusting the cable-guide to permit the cable to drop from the horizontal grip-wheel, substantially as described.

3. The combination, with a car adapted to travel on a track and a non-traveling cable, of an electric motor on the car, a horizontally-revolving grip-wheel suspended beneath the car to engage the cable and from which said cable can drop for running the car on a branch road, and reducing-gear between the motor and the grip-wheel, substantially as described.

4. The combination, with a wheeled car for traveling on a track and a non-traveling cable, of an electric motor on the car, a horizontally-revolving grip-wheel for engaging the cable and from which said cable can drop, a cable-guide for sustaining and causing the cable to move into and out of engagement with the grip-wheel, and lever mechanism operated by the engineer at will for moving the cable-guide, substantially as described.

5. The combination, with a car and a non-traveling cable, of a motor thereupon, a horizontally-revolving grip-wheel driven by the motor, adjustable plates carrying guide-rollers, a shaft engaging both plates, and means for turning the shaft to cause the non-traveling cable to move into and out of engagement with the grip-wheel, substantially as described.

6. The combination, with a car, of a motor thereupon, a horizontal grip-wheel driven by the motor, the two pivoted plates having racks and carrying cable-guides, the shaft geared to both racks, and a lever under control of the engineer for turning the shaft to cause a non-traveling cable to move into and out of engagement with the grip-wheel, substantially as described.

7. The combination, with a car having wheels to travel on a track and a non-traveling cable, of an electric motor on the car, a horizontally-revolving motor-driven grip-wheel having a circumferential groove to engage the cable and from which groove the cable is capable of being dropped at the will of the engineer to run the car on a branch road, and a cable-guide for moving the cable into the groove of the grip-wheel, substantially as described.

In testimony whereof I have affixed my signature in presence of two witnesses.

FRANCIS A. POCOCK.

Witnesses.
H. M. STREETER,
A. D. HOLLAND.